Aug. 29, 1933.  F. C. REEDER  1,925,002
PROCESS OF PASTEURIZATION
Original Filed May 28, 1928
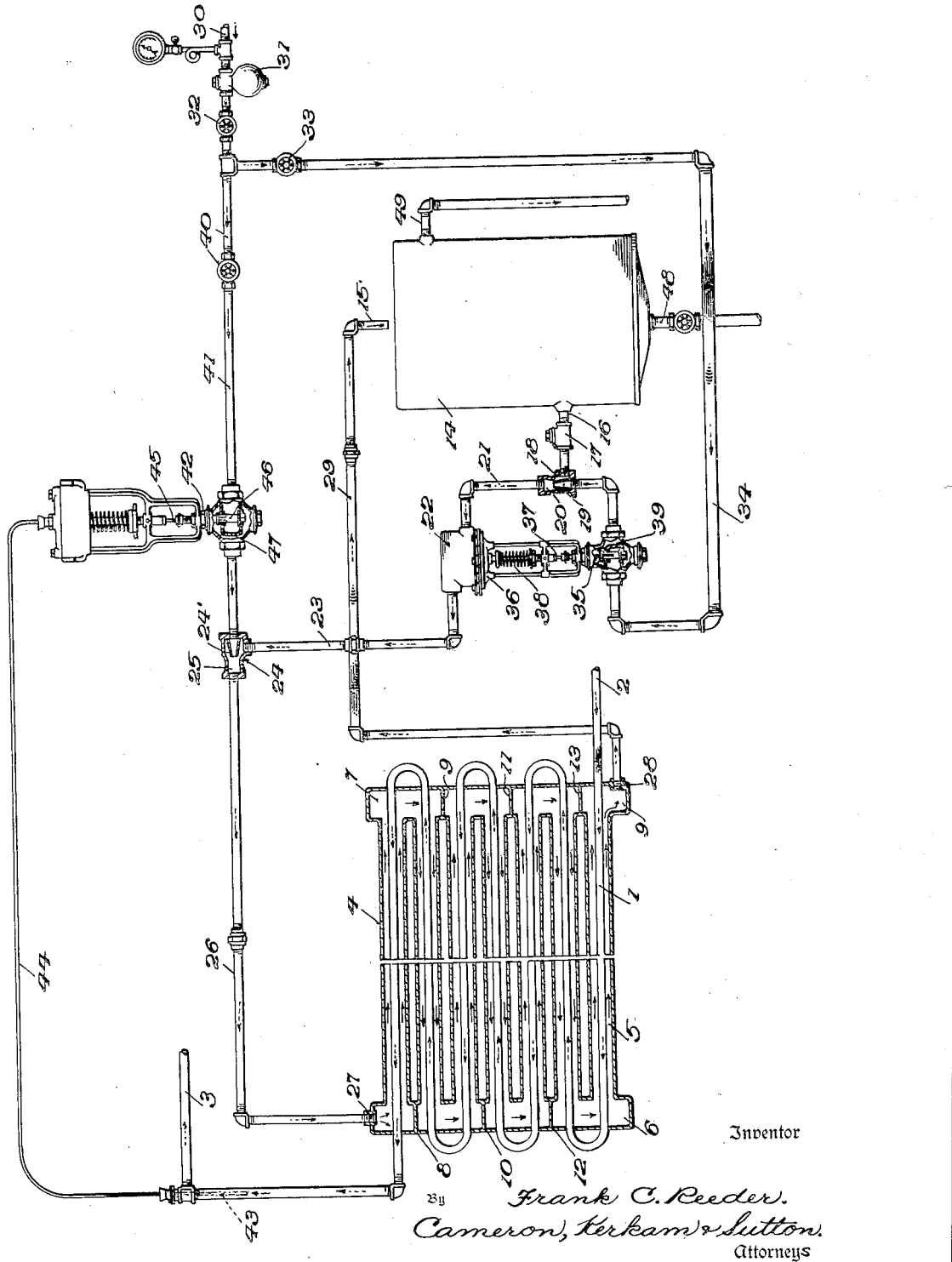

Patented Aug. 29, 1933

1,925,002

UNITED STATES PATENT OFFICE 1,925,002

PROCESS OF PASTEURIZATION

Frank C. Reeder, Knoxville, Tenn., assignor to The Fulton Sylphon Company, Knoxville, Tenn., a corporation of Delaware Original application May 28, 1928, Serial No. 281,244. Divided and this application August 4, 1930. Serial No. 472,982

1 Claim. (Cl. 99—15)

This invention relates to an improved method for pasteurizing liquids, and more specifically to a method for heating the liquids to be treated to the pasteurizing temperatures. This application is a division of my application Serial No. 281,244, filed May 28, 1928, for Method and apparatus for pasteurization and which has matured into Patent No. 1,884,231, granted October 25, 1932.

It is well known that the process of pasteurization depends for its success on a rapid and uniform treating of the liquid to be pasteurized, with an accurate control of the pasteurizing temperature in order to secure sterilization without producing undesired changes in the character of the treated liquids.

One process which has been used for this purpose involves passing the milk or other liquid to be sterilized through a coil of pipe within a water jacket, flowing hot water through the jacket by means of a circulating pump, and maintaining the temperature and flow of the water and the flow of the liquid in such relation that the liquid, in passing through the coil, will be raised to the desired temperature. In practice, however, it has been found extremely difficult to maintain the proper relationship of the variable factors of the system, with the result that the product has not been uniform, and has been subjected to incomplete sterilization due to low temperature, or impairment of its quality due to high temperature.

One object of this invention therefore is to provide a process for pasteurizing liquids embodying an improved method of heat control whereby the temperature of the liquid to be pasteurized is quickly raised to the desired point and accurately maintained in spite of variation in the rate of flow of the liquid.

More specifically, this invention comprises a method of heat control for pasteurization involving the raising of the temperature of the heating liquid in two stages, the first stage being designed to maintain the heating liquid at a constant temperature somewhat below the pasteurizing temperature, and the second stage adding sufficient heat to maintain the liquid to be sterilized at the desired temperature.

Another object is to provide a two stage pasteurizing process in which the first stage temperature of the heating liquid is automatically controlled by the interstage temperature of the heating liquid and the second stage temperature is automatically controlled by the temperature of the liquid to be pasteurized.

Another object is to provide such a pasteurizing process in which the heating liquid is forcibly circulated without the use of moving mechanical parts.

Other objects and advantages of the invention will appear from the following description, taken in connection with the appended drawing, in which one apparatus suitable for carrying out the invention is illustrated diagrammatically in elevation.

In the drawing numeral 1 denotes a suitable heating coil for the liquids to be pasteurized, shown as comprising a plurality of parallel sections connected by return bends, and having an inlet 2 and an outlet 3. The heating coil is surrounded by a water jacket 4 comprising parallel tubes 5, each of which surrounds a section of the heating coil, and headers 6 and 7 in which the ends of the tubes 5 are fixed in any suitable manner. The headers 6 and 7 are provided with staggered partitions 8, 9, 10, 11, 12, 13, etc., so arranged that the heating liquid is caused to flow through all the tubes 5 in series.

A reservoir 14 is provided for the heating liquid and has an inlet 15, outlet 16, drain 48 and overflow 49. Heating liquid from the reservoir passes through the outlet 16 and check valve 17 to the steam injector 18 comprising jet 19 and Venturi chamber 20. From thence the liquid flows through conduit 21, thermostat chamber 22, and conduit 23 to the second steam injector 24 which comprises jet 24' and Venturi chamber 25. From the second injector the fluid flows through conduit 26 to the inlet 27 of the water jacket 4. The heating fluid then circulates back and forth through the tubes 5 of the water jacket, giving up its heat to the heating coil 1 therein, and flows from the outlet 28 through the conduit 29 back into the reservoir 14 through the inlet 15.

It will be noted that the return line 29 rises above the level of the top of the water jacket in order that the latter may always remain filled with the heating liquid.

Steam for operating the injector 18 is supplied from pipe 30 through strainer 31, hand valves 32 and 33, and conduit 34 to thermostatically-operated valve 35 which controls the flow of steam to the injector 18. This valve, as shown, is of the balanced-poppet type and is controlled by any suitable type of thermostat such as illustrated at 36. As there indicated, a thermostat in chamber 22 operates the valve stem 37 against the pressure of an adjustable spring 38 and closes the valve when the temperature of the liquid in the chamber 22 rises above a predetermined degree.

A small by-pass opening 39 is drilled in the web of the valve so that the thermostat cannot completely cut off the steam from the injector 18, sufficient steam being admitted at all times to secure the necessary circulation of the heating liquid. It will thus be seen that the injector 18 provides a continuous flow of heating liquid at a constant temperature.

The second injector is supplied with steam from pipe 30 through hand valves 32 and 40 and pipe 41 to the thermostatically-operated valve 42 controlling the flow of steam to nozzle 24'. The thermostat of this valve may also be of any suitable type, being shown as composed of a bulb 43, located in the outlet 3 of the coil 1, and connected by a small tube 44 to a flexible, expansible and collapsible chamber connected to the valve 42. The valve stem 45 is operated by the flexible chamber to control the valve 46 and admit just sufficient steam to the injector 24 to keep the fluid leaving the heating coil at the exact pasteurizing temperature.

The web of thermostat valve 42 is also provided with a by-pass opening 47 to admit sufficient steam to injector 24 to secure a continuous circulation of the heating liquid.

In operation the heating water system is filled to the level of the over-flow 49, and valves 32 and 33 are opened to admit steam to injector 18 for heating and circulating the water. Thermostat valve 35 is then adjusted to hold the temperature of the water passing through the chamber 22 at a fixed suitable degree, say 15 or 20 degrees below the temperature of pasteurization.

The milk or other liquid to be pasteurized is circulated through the heating coil 1 by a circulating pump or by gravity from a supply tank not shown. Valve 40 is then opened to admit steam to the second injector 24, and thermostat valve 42 is adjusted to hold the temperature of the milk in the outlet 3 exactly at the desired pasteurizing heat, which is usually set at 145 degrees F.

This method of heat regulation above set forth has been found to be especially well adapted to close control, in that the thermostatic controlling devices for the two heat sources are subject to different time lags, which brings about an automatic damping effect of one source on the other.

It will be understood that certain variations may be made in the method and that the apparatus above disclosed is only one of various apparatus that could be employed to carry out the process of this invention. It is therefore to be understood that the foregoing disclosure of apparatus is to be considered as illustrative only, and not as limiting the invention defined by the appended claim.

What is claimed is:

In a process for pasteurizing liquids, circulating the liquid to be pasteurized, circulating a heating fluid in heat interchanging relation with said liquid to be pasteurized, injecting steam into said heating fluid to circulate the same and raise the temperature thereof to a temperature predeterminately below that of pasteurization, thermostatically controlling the amount of said steam injection in conformity with the temperature of said heating fluid after it has been heated by said injection of steam but before it flows into heat interchanging relation with the liquid to be pasteurized, injecting steam into said heating fluid in a second stage to impart additional kinetic energy to said heating fluid and to raise its temperature to the predetermined pasteurizing temperature before flowing into heat interchanging relation with said liquid to be pasteurized controlling the amount of said second injection of steam from the temperature of the pasteurized liquid as it flows out of heat interchanging relationship with said heating fluid.

FRANK C. REEDER.